United States Patent
Choi et al.

(10) Patent No.: US 7,807,913 B2
(45) Date of Patent: Oct. 5, 2010

(54) MOTION-BASED SOUND SETTING APPARATUS AND METHOD AND MOTION-BASED SOUND GENERATING APPARATUS AND METHOD

(75) Inventors: Eunseok Choi, Anyang-si (KR); Dongyoon Kim, Seoul (KR); Wonchul Bang, Seongnam-si (KR); Sung-jung Cho, Suwon-si (KR); Jongkoo Oh, Suwon-si (KR); Eunkwang Ki, Seoul (KR); Joonkee Cho, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 688 days.

(21) Appl. No.: 11/329,047

(22) Filed: Jan. 11, 2006

(65) Prior Publication Data

US 2006/0170562 A1 Aug. 3, 2006

(30) Foreign Application Priority Data

Feb. 1, 2005 (KR) ...................... 10-2005-0009110

(51) Int. Cl.
*G10H 1/00* (2006.01)
*G10H 1/18* (2006.01)
*G10H 7/00* (2006.01)

(52) U.S. Cl. .............................. 84/600; 84/615; 84/723
(58) Field of Classification Search .................. 84/600, 84/615, 723
See application file for complete search history.

(56) References Cited

U.S. PATENT DOCUMENTS

| | | | |
|---|---|---|---|
| 5,177,311 A | 1/1993 | Suzuki et al. ................. 84/600 |
| 5,541,358 A | 7/1996 | Wheaton et al. ............... 84/645 |
| 6,867,361 B2 * | 3/2005 | Nishitani et al. ............... 84/658 |
| 7,060,885 B2 * | 6/2006 | Ishida et al. ................... 84/626 |
| 7,297,856 B2 * | 11/2007 | Sitrick ...................... 84/477 R |
| 2002/0026866 A1 * | 3/2002 | Nishitani et al. ............... 84/600 |
| 2002/0088335 A1 | 7/2002 | Nishitani et al. ............... 84/600 |
| 2003/0045274 A1 | 3/2003 | Nishitani ..................... 455/414 |
| 2004/0011189 A1 * | 1/2004 | Ishida et al. ................... 84/626 |

FOREIGN PATENT DOCUMENTS

GB  2347593  9/2000

OTHER PUBLICATIONS

Verplaetse, C., "Inertial proprioceptive devices: Self-motion-sensing toys and tools," IBM Systems Journal, vol. 35, Nos. 3&4, pp. 639-650, 1996.

* cited by examiner

*Primary Examiner*—Jeffrey Donels
(74) *Attorney, Agent, or Firm*—Staas & Halsey LLP

(57) ABSTRACT

A motion-based sound setting apparatus and method and motion-based sound generating apparatus and method. The motion-based sound setting apparatus includes a mode selection recognizing unit, a motion sensing unit, a motion pattern recognizing unit, and a sound signal setting controlling unit. The mode selection recognizing unit recognizes a user's action with respect to a sound setting mode or a sound generating mode. The motion sensing unit senses a motion of a predetermined device and outputting a result of the sensing as a sensing signal. The motion pattern recognizing unit recognizes a motion pattern of the predetermined device, which corresponds to the sensing signal, in response to a result of the recognition made by the mode selection recognizing unit. The sound signal setting controlling unit sets a sound signal corresponding to the motion pattern recognized by the motion pattern recognizing unit.

21 Claims, 6 Drawing Sheets

FIG. 2

| SOUND ELEMENT | MOTION PATTERN | SOUND SIGNAL |
|---|---|---|
| VOLUME (SOUND STRENGTH) | ⌄ | UP |
|  | ⌃ | DOWN |
| PITCH (OCTAVE) | ∧ | UP |
|  | ∨ | DOWN |
| TONE (INSTRUMENT) | ↓ | PIANO |
|  | 2 | VIOLIN |
|  | 3 | CELLO |
|  | 4 | VIOLA |
|  | 5 | TAMBOURINE |
|  | 6 | BIG DRUM |
|  | 7 | SMALL DRUM |

MOTION-BASED SOUND SETTING APPARATUS AND METHOD AND MOTION-BASED SOUND GENERATING APPARATUS AND METHOD

CROSS-REFERENCE TO RELATED APPLICATION

This application claims the benefit of Korean Patent Application No. 10-2005-0009110, filed on Feb. 1, 2005, in the Korean Intellectual Property Office, the disclosure of which is incorporated herein by reference.

BACKGROUND OF THE INVENTION

1. Field of the Invention

The present invention relates to a motion-based sound setting apparatus and method and a motion-based sound generating apparatus and method, in which once a user performs a predetermined action in a three-dimensional (3D) space, a motion measuring sensor measures the predetermined action, a measured signal is recognized, and a sound signal corresponding to a result of the recognition is set.

2. Description of Related Art

Conventional sound generating apparatuses can generate only a predetermined sound signal among sound elements or change a sound signal into another using a button. If a single sound signal can be selected using a single button, a plurality of buttons would be required to select various sound signals.

As a result, it is difficult to miniaturize the conventional sound generating apparatuses due to a need for a plurality of buttons.

If a single button is used to select another sound signal, it would cause the inconvenience of having to manipulating the same button several times.

BRIEF SUMMARY

An aspect of the present invention provides a motion-based sound setting apparatus which sets various sound signals corresponding to user's actions.

An aspect of the present invention also provides a motion-based sound generating apparatus including the motion-based sound setting apparatus.

An aspect of the present invention also provides a motion-based sound setting method, by which various sound signals corresponding to user's actions are set.

An aspect of the present invention also provides a motion-based sound generating method including the motion-based sound setting method.

According to an aspect of the present invention, there is provided a motion-based sound setting apparatus including a mode selection recognizing unit, a motion sensing unit, a motion pattern recognizing unit, and a sound signal setting controlling unit. The mode selection recognizing unit recognizes a user's action with respect to a sound setting mode or a sound generating mode. The motion sensing unit senses a motion of a predetermined device and outputting a result of the sensing as a sensing signal. The motion pattern recognizing unit recognizes a motion pattern of the predetermined device, which corresponds to the sensing signal, in response to a result of the recognition made by the mode selection recognizing unit. The sound signal setting controlling unit sets a sound signal corresponding to the motion pattern recognized by the motion pattern recognizing unit.

According to another aspect of the present invention, there is provided a motion-based sound generating apparatus including a mode selection recognizing unit, a motion sensing unit, a motion pattern recognizing unit, a sound signal setting controlling unit, and a sound generating unit. The mode selection recognizing unit recognizes a user's selection of a sound setting mode or a sound generating mode. The motion sensing unit senses a motion of a predetermined device and outputs a result of the sensing as a sensing signal. The motion pattern recognizing unit recognizes a motion pattern of the predetermined device, which corresponds to the sensing signal, in response to a result of the recognition made by the mode selection recognizing unit. The sound signal setting controlling unit sets a sound signal corresponding to the motion pattern recognized by the motion pattern recognizing unit. The sound generating unit generates a sound corresponding to the motion pattern recognized by the motion pattern recognizing unit.

According to still another aspect of the present invention, there is provided a motion-based sound setting method. The motion-based sound setting method includes recognizing a user's action with respect to a sound setting mode or a sound generating mode, sensing a motion of a predetermined device if it is recognized that a user selects the sound setting mode, recognizing a motion pattern of the predetermined device, and setting a sound signal corresponding to the recognized motion pattern.

According to yet another aspect of the present invention, there is provided a motion-based sound generating method. The motion-based sound generating method includes recognizing a user's selection of a sound setting mode or a sound generating mode, sensing a motion of a predetermined device if it is recognized that a user selects the sound setting mode, recognizing a motion pattern of the predetermined device, setting a sound signal corresponding to the recognized motion pattern and recognizing a user's selection again, sensing a motion of the predetermined device if it is recognized that the user selects the sound generating mode, recognizing a motion pattern of the predetermined device, and generating a sound corresponding to the recognized motion pattern.

According to another aspect of the present invention, there is provided a motion-based sound setting apparatus, including: a mode selection recognizing unit recognizing a user's selection of a sound setting mode or a sound generating mode by an action; a motion sensing unit sensing a motion of a predetermined device and outputting a result of the sensing as a sensing signal; a motion pattern recognizing unit recognizing a motion pattern of the predetermined device, which corresponds to the sensing signal, in response to a recognition result of the recognition; and a sound signal setting controlling unit setting a sound signal corresponding to the recognized motion pattern.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 2 illustrates motion patterns and sound signals corresponding to the motion patterns;

DETAILED DESCRIPTION OF EMBODIMENTS

Figure 1:
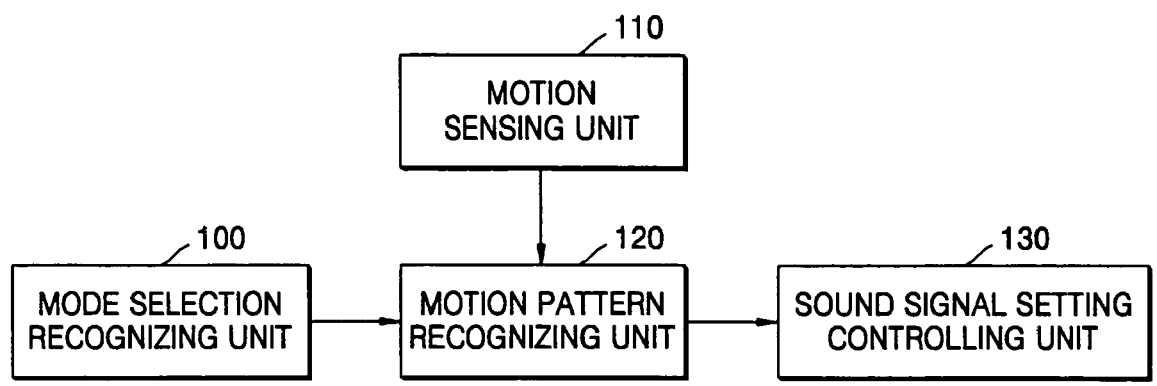
FIG. 1 is a block diagram of a motion-based sound setting apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a motion-based sound setting apparatus according to an embodiment of the present invention.

Referring to FIG. 1, the motion-based sound setting apparatus includes a mode selection recognizing unit 100, a motion sensing unit 110, a motion pattern recognizing unit 120, and a sound signal setting controlling unit 130.

The mode selection recognizing unit 100 recognizes a user's selection of a sound setting mode or a sound generating mode. The sound setting mode is a user selection mode for setting a sound based on a user's action. The sound generating mode is also a user selection mode for generating a sound based on a user's action. The motion selection recognizing unit 100 recognizes whether a user selects the sound setting mode or the sound generating mode and outputs a result of the recognition to the motion pattern recognizing unit 120.

The mode selection recognizing unit 100 recognizes a user's action that is one of button manipulation, voice input, and video input using a camera as a user's selection of the sound setting mode or the sound generating mode. In other words, once the user manipulates a button, inputs a voice, inputs a specific video into a camera, or inputs a bio-signal such as user's pupils or finger prints, the mode selection recognizing unit 100 recognizes such a user's action as the user's selection of the sound setting mode or the sound generating mode.

The motion sensing unit 110 senses a motion of a predetermined device and outputs a result of the sensing as a sensing signal to the motion pattern recognizing unit 120. Here, the predetermined device is a portable terminal. In other words, the predetermined device is a portable device such as a cellular phone or a personal digital assistant (PDA).

The motion sensing unit 110 includes at least one of an acceleration sensor, an angular velocity sensor, a geomagnetic sensor, and a tilt sensor. The acceleration and angular velocity of the predetermined device change with motions of the predetermined device. The acceleration sensor, the deceleration sensor, the geomagnetic sensor, and the tilt sensor are used to sense a change in the acceleration or the angular velocity of the predetermined device. The angular velocity sensor senses the angular velocity of the predetermined device, i.e., whether the predetermined device moves left/right, up/down, or clockwise/counterclockwise, and outputs a result of the sensing with respect to the angular velocity as a sensing signal. The acceleration sensor senses the acceleration of the predetermined device, i.e., a change in the motion velocity of the predetermined device, and outputs a result of the sensing with respect to the acceleration as a sensing signal. The tilt sensor senses the degree to which the predetermined device is tilted with respect to the gravity direction.

The motion pattern recognizing unit 120 recognizes a motion pattern of the predetermined device, which corresponds to the sensing signal output from the motion sensing unit 110, in response to a result of the recognition made by the mode selection recognizing unit 100 and outputs a result of its recognition to the sound signal setting controlling unit 130.

FIG. 2 illustrates motion patterns and sound signals corresponding to the motion patterns. As shown in FIG. 2, the motion pattern recognizing unit 120 recognizes which motion pattern a motion of the predetermined device, sensed by the motion sensing unit 110, corresponds to. In other words, the motion pattern recognizing unit 120 recognizes whether the predetermined device moves left/right or up/down or moves to express a figure.

The sound signal setting controlling unit 130 sets a sound signal corresponding to a motion pattern recognized by the motion pattern recognizing unit 120.

Figure 3:
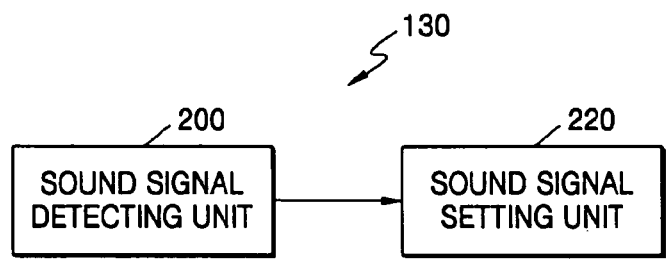
FIG. 3 is a block diagram of an example of a sound signal setting controlling unit shown in FIG. 1.

FIG. 3 is a block diagram of an example of the sound signal setting controlling unit 130 shown in FIG. 1.

Referring to FIGS. 1 and 3, the sound signal setting controlling unit 130 includes a sound signal detecting unit 200 and a sound signal setting unit 220.

The sound signal detecting unit 200 identifies a sound signal corresponding to the motion pattern recognized by the motion pattern recognizing unit 120 and outputs a result of the identification to the sound signal setting unit 220. For example, referring to FIG. 2, when the motion pattern recognized by the motion pattern recognizing unit 120 expresses a figure "3", the sound signal detecting unit 200 identifies a predetermined sound signal "Cello" corresponding to the figure "3".

The sound signal setting unit 220 sets the sound signal identified by the sound signal detecting unit 200 as a sound signal for sound generation. For example, referring to FIG. 2, when the sound signal "Cello" is identified by the sound signal detecting unit 200, the sound signal setting unit 220 sets the sound signal "Cello" as a sound signal to be used for sound generation.

Hereinafter, a motion-based sound generating apparatus according to an embodiment of the present invention will be described with reference to FIGS. 4 and 5.

Figure 4:
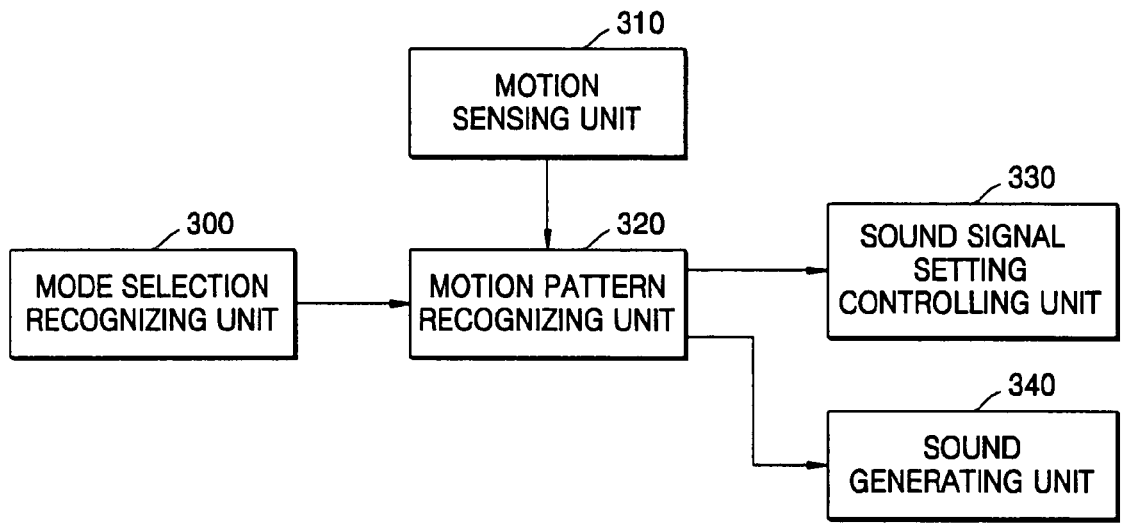
FIG. 4 is a block diagram of a motion-based sound generating apparatus according to an embodiment of the present invention.

FIG. 4 is a block diagram of a motion-based sound generating apparatus according to an embodiment of the present invention.

Referring to FIG. 4, the motion-based sound generating apparatus includes a motion selection recognizing unit 300, a motion sensing unit 310, a motion pattern recognizing unit 320, a sound signal setting controlling unit 330, and a sound generating unit 340.

The mode selection recognizing unit 300 recognizes a user's selection of the sound setting mode or the sound generating mode and outputs a result of the recognition to the motion pattern recognizing unit 320. The mode selection recognizing unit 300 recognizes a user's action that is one of button manipulation, voice input, video input using a camera, and the input of a bio-signal such as user's pupils or finger prints as the user's selection of the sound setting mode or the sound generating mode. Since the mode selection recognizing unit 300 is similar to the mode selection recognizing unit 100, it will not be described in detail.

The motion sensing unit 310 senses a motion of the predetermined device and outputs a result of the sensing to the motion pattern recognizing unit 320 as a sensing signal. Here, the predetermined device is a portable terminal. In other words, the predetermined device is a portable device such as a cellular phone or a PDA. The motion sensing unit 310 includes at least one of an acceleration sensor, an angular velocity sensor, a geomagnetic sensor, and a tilt sensor. Since the motion sensing unit 310 is similar to the motion sensing unit 110, it will not be described in detail.

The motion pattern recognizing unit 320 recognizes a motion pattern of the predetermined device, which corresponds to the sensing signal output from the motion sensing unit 310, in response to a result of the recognition made by the mode selection recognizing unit 300 and outputs a result of its recognition to the sound signal setting controlling unit 330 and the sound generating unit 340.

As shown in FIG. 4, the motion pattern recognizing unit 320 recognizes which motion pattern a motion of the predetermined device, sensed by the motion sensing unit 310, corresponds to. For example, if a user's selection of the sound setting mode is input to the motion pattern recognizing unit 320 from the mode selection recognizing unit 300 and a motion pattern of the predetermined device, which corresponds to the sensing signal output from the motion sensing unit 310, is the figure "3", the motion pattern recognizing unit 320 recognizes that a motion pattern of the predetermined device, which corresponds to the sensing signal output from the motion sensing unit 310, is the figure "3", and outputs a result of the recognition to the sound signal setting controlling unit 330.

Once the user's selection of the sound generating mode is input to the motion pattern recognizing unit 320 from the mode selection recognizing unit 300, the motion pattern recognizing unit 320 recognizes a motion pattern of the predetermined device for sound generation and outputs a result of the recognition to the sound generating unit 340. For example, if a motion pattern of the predetermined device for sound generation is a left/right motion or an up/down motion, the motion pattern recognizing unit 320 recognizes whether a motion of the predetermined device, sensed by the motion sensing unit 310, is a left/right motion or an up/down motion, and outputs a result of the recognition to the sound generating unit 340.

The sound signal setting controlling unit 330 sets a sound signal corresponding to the motion pattern recognized by the motion pattern recognizing unit 320.

Figure 5:
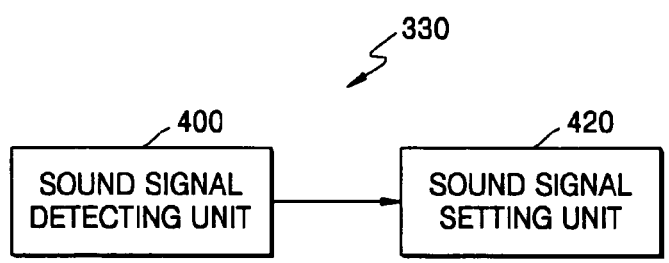
FIG. 5 is a block diagram of an example of a sound signal setting controlling unit shown in FIG. 4.

FIG. 5 is a block diagram of an example of the sound signal setting controlling unit 330 shown in FIG. 4.

Referring to FIGS. 4 and 5, the sound signal setting controlling unit 330 includes a sound signal detecting unit 400 and a sound signal setting unit 420.

The sound signal detecting unit 400 identifies a sound signal corresponding to the motion pattern recognized by the motion pattern recognizing unit 320 and outputs a result of the identification to the sound signal setting unit 420. Since the sound signal detecting unit 400 is similar to the sound signal detecting unit 200, it will not described in detail.

The sound signal setting unit 420 sets the sound signal identified by the sound signal detecting unit 400 as a sound signal for sound generation. Since the sound signal setting unit 420 is similar to the sound signal setting unit 220, it will not be described in detail.

The sound generating unit 340 generates a sound corresponding to the motion pattern recognized by the motion pattern recognizing unit 320.

The sound generating unit 340 includes a storage medium that stores various sound information about sound signals corresponding to motion patterns. For example, the storage medium stores sound information about various sound signals shown in FIG. 2.

The sound generating unit 340 includes at least one speaker or sound output terminal to generate a sound signal corresponding to a motion pattern.

Hereinafter, a motion-based sound setting method according to an embodiment of the present invention will be described with reference to FIG. 6.

Figure 6:
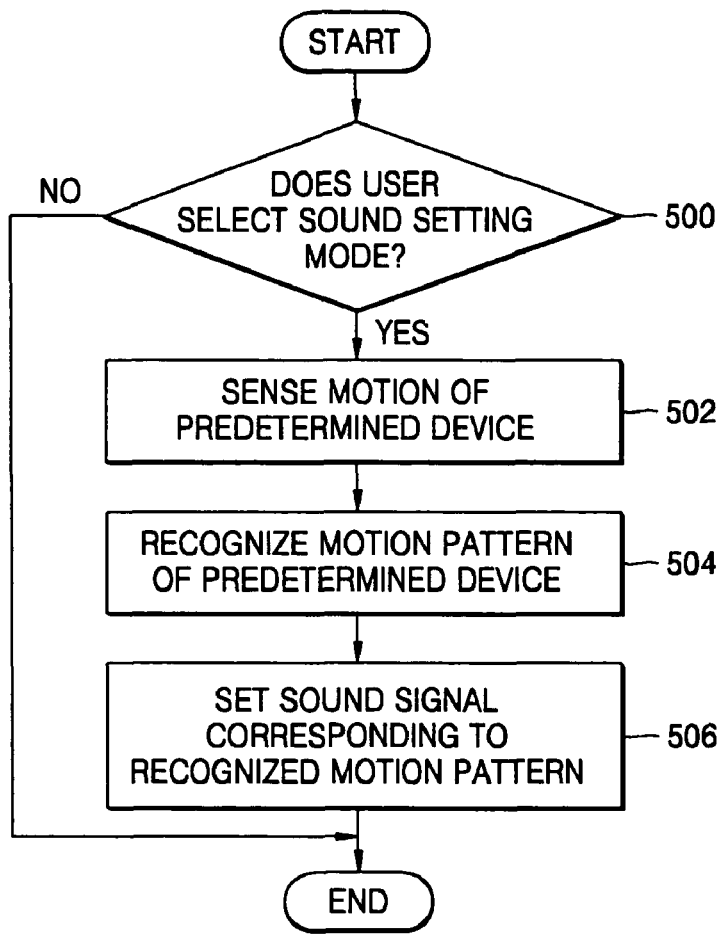
FIG. 6 is a flowchart illustrating a motion-based sound setting method according to an embodiment of the present invention.

FIG. 6 is a flowchart illustrating a motion-based sound setting method according to an embodiment of the present invention.

In operation 500, a user's selection of a sound setting mode or a sound generating mode is recognized. At this time, a user's action that is one of button manipulation, voice input, video input using a camera, and the input of a bio-signal such as user's pupils or finger prints is recognized as the user's selection of the sound setting mode or the sound generating mode. In other words, if a user manipulates a button, inputs a voice, inputs a specific video into a camera, or inputs a bio-signal, such a user's action is recognized as the user's selection of the sound setting mode or the sound generating mode.

If it is recognized that the user selects the sound setting mode in operation 500, a motion of a predetermined device is sensed in operation 502. The acceleration and angular velocity of the predetermined device change with motions of the predetermined device, and such a change in the acceleration or the angular velocity of the predetermined device is sensed.

In operation 504, a motion pattern of the predetermined device is recognized. In other words, it is recognized whether the predetermined device moves left/right or up/down or moves to express a figure.

In operation 506, a sound signal corresponding to the recognized motion pattern is set.

Figure 7:
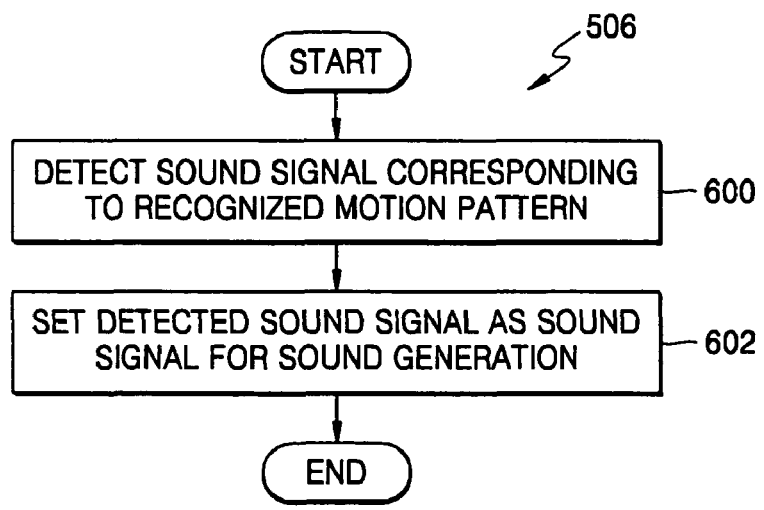
FIG. 7 is a flowchart illustrating in detail operation 506 shown in FIG. 6.

FIG. 7 is a flowchart illustrating in detail operation 506 shown in FIG. 6

Referring to FIGS. 2, 6, and 7, in operation 600, a sound signal corresponding to the recognized motion pattern is identified. For example, referring to FIG. 2, if the motion pattern recognized in operation 504 is the figure "3", a predetermined sound signal "Cello" corresponding to the motion pattern "3" is identified. In operation 602, the identified sound signal is set as a sound signal for sound generation. For example, referring to FIG. 2, if the sound signal "Cello" is identified in operation 600, the identified sound signal "Cello" is set as a sound signal for sound generation.

Hereinafter, a motion-based sound generating method according to an embodiment of the present invention will be described in detail with reference to FIGS. 8 and 9.

Figure 8:
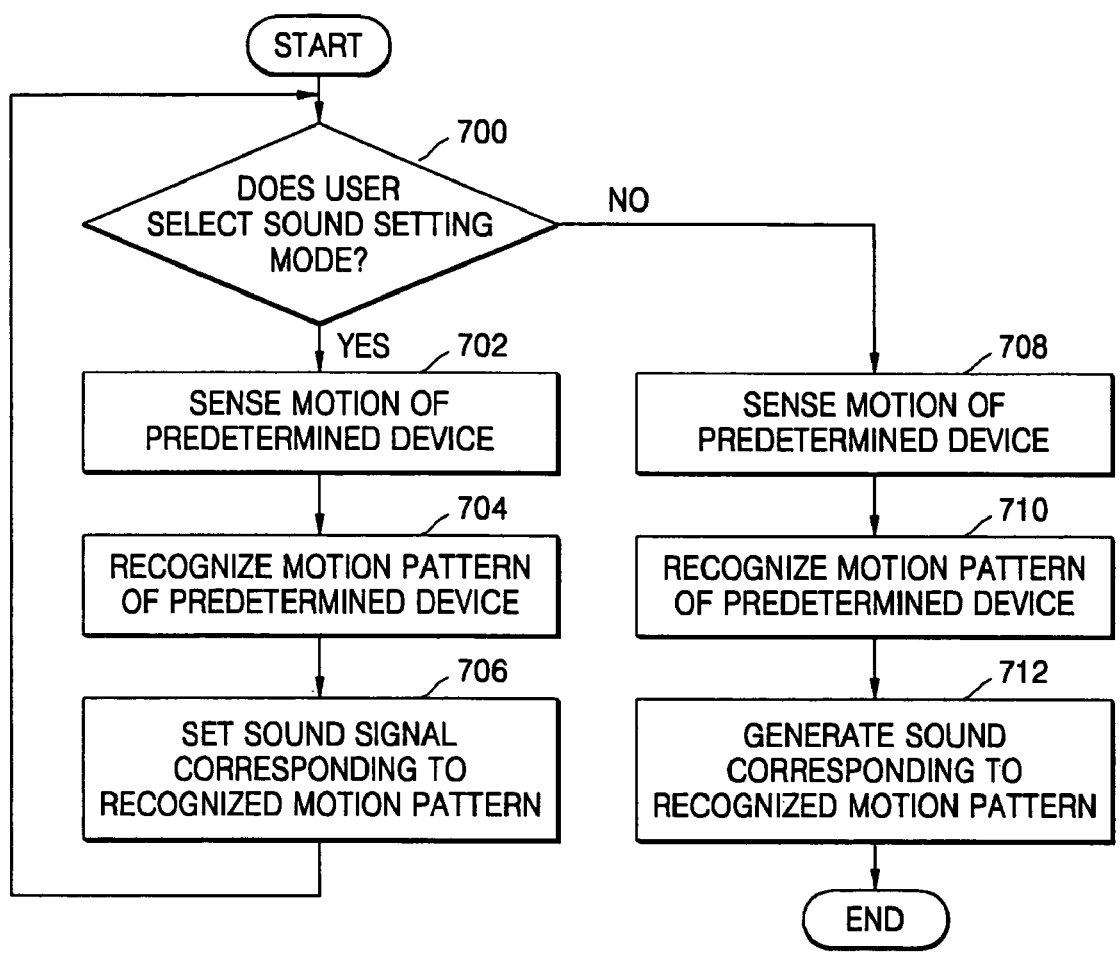
FIG. 8 is a flowchart illustrating a motion-based sound generating method according to an embodiment of the present invention.

FIG. 8 is a flowchart illustrating a motion-based sound generating method according to an embodiment of the present invention.

In operation 700, a user's selection of a sound setting mode or a sound generating mode is recognized. At this time, a user's action that is one of button manipulation, voice input, video input using a camera, and the input of a bio-signal such as user's pupils or finger prints is recognized as the user's selection of the sound setting mode or the sound generating mode. In other words, if a user manipulates a button, inputs a voice, inputs a specific video into a camera, or inputs a bio-signal, such a user's action is recognized as the user's selection of the sound setting mode or the sound generating mode.

In operation 702, if it is recognized that the user selects the sound setting mode, a motion of a predetermined device is sensed. The acceleration and angular velocity of the predetermined device change with motions of the predetermined device, and such a change in the acceleration or the angular velocity of the predetermined device is sensed.

In operation 704, a motion pattern of the predetermined device is recognized. In other words, it is recognized whether the predetermined device moves left/right or up/down or moves to express a figure.

In operation 706, a sound signal corresponding to the recognized motion pattern is set.

Figure 9:
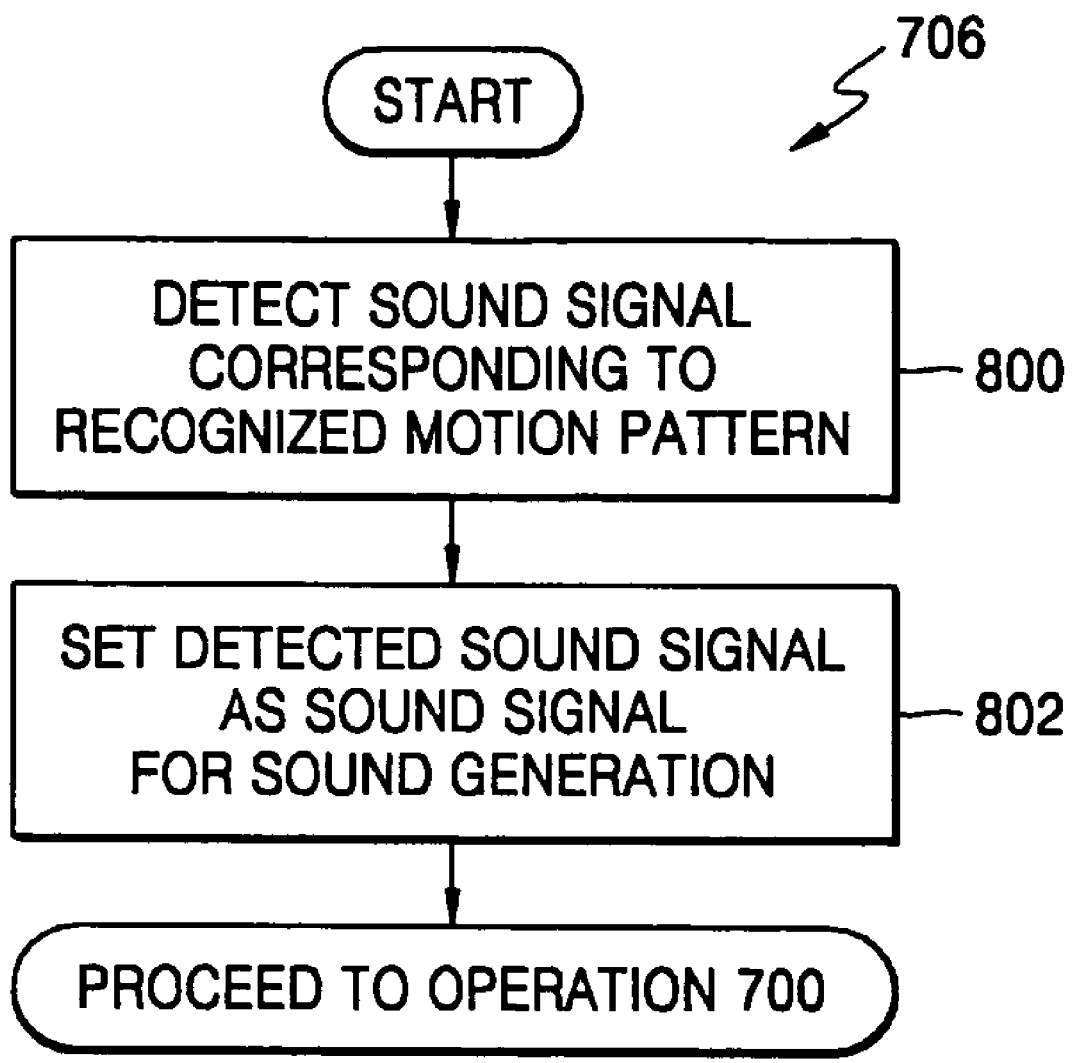
FIG. 9 is a flowchart illustrating in detail operation 706 shown in FIG. 8.

FIG. 9 is a flowchart illustrating in detail operation 706 shown in FIG. 8.

In operation 800, a sound signal corresponding to the recognized motion pattern is identified.

In operation 802, the identified sound signal is set as a sound signal for sound generation.

After operation 706, a process goes back to operation 700 to recognize a user's selection of the sound setting mode or the sound generating mode.

If the user does not select the sound setting mode in operation 700, a motion of the predetermined device is sensed in operation 708.

After operation 708, a motion pattern of the predetermined device is recognized in operation 710. For example, if a motion pattern of the predetermined device for sound generation is a left/right motion or an up/down motion, it is recognized whether the motion of the predetermined device is a left/right motion or an up/down motion.

After operation 710, a sound corresponding to the recognized motion pattern is generated in operation 712.

In the motion-based sound setting apparatus and method and the motion-based sound generating apparatus and method according to the above-described embodiments of the present invention, various sound elements can be set according to a user's action without manipulating a plurality of buttons or manipulating a button a number of times to select the sound elements.

Thus, according to the above-described embodiments of the present invention, a configuration of a sound generating apparatus can be simplified.

In addition, by performing an action when a sound is generated, a user can easily change the generated sound into another.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A motion-based sound setting apparatus comprising:
a mode selection recognizing unit recognizing whether a users action is a sound setting mode or a sound generating mode;
a motion sensing unit sensing a motion of a predetermined device and outputting a result of the sensing as a sensing signal;
a motion pattern recognizing unit recognizing a motion pattern of the predetermined device that corresponds to the sensing signal based on a result of the recognition made by the mode selection recognizing unit; and
a sound signal setting controlling unit setting a sound signal to be used for generating a sound corresponding to another subsequent motion pattern recognized by the motion pattern recognizing unit,
wherein the mode selection recognizing unit recognizes the user's action based on one of a button manipulation, a voice input, a video input using a camera, and an input of a bio-signal including the user's pupils or finger prints, and
wherein during the recognized sound setting mode the setting of the sound signal is set based upon the recognized motion pattern and during the recognized sound generating mode sound is generated based upon another recognized motion pattern of the predetermined device and the set sound signal defined by the sound signal setting controlling unit.

2. The motion-based sound setting apparatus of claim 1, wherein the motion sensing unit includes at least one of an acceleration sensor, an angular velocity sensor, a geomagnetic sensor, and a tilt sensor.

3. The motion-based sound setting apparatus of claim 1, wherein the sound signal setting controlling unit comprises:
a sound signal identification unit identifying the sound signal that corresponds to the recognized motion pattern; and
a sound signal setting unit setting the identified sound signal as the set sound signal to be used for the generating of the sound.

4. The motion-based sound setting apparatus of claim 1, wherein the predetermined device is a cellular phone or a personal digital assistant (PDA).

5. The motion-based sound setting apparatus of claim 1, wherein the mode selection recognizing unit recognizes the user's action based on one of a button manipulation, a voice input, a video input using a camera, and an input of a bio-signal including the user's pupils or finger prints.

6. A motion-based sound generating apparatus comprising:
a mode selection recognizing unit recognizing whether a user's action is a sound setting mode or a sound generating mode;
a motion sensing unit sensing a motion of a predetermined device and outputting a result of the sensing as a sensing signal;
a motion pattern recognizing unit recognizing a motion pattern of the predetermined device that corresponds to the sensing signal based on a result of the recognition made by the mode selection recognizing unit
a sound signal setting controlling unit setting a sound signal to be used for generating a sound corresponding to another subsequent motion pattern recognized by the motion pattern recognizing unit; and
a sound generating unit generating a sound according to the set sound signal,
wherein the mode selection recognizing unit recognizes the user's action based on one of a button manipulation, a voice input, a video input using a camera, and an input of a bio-signal including the user's pupils or finger prints, and
wherein during the recognized sound setting mode the setting of the sound signal is set based upon the recognized motion pattern and during the recognized sound generating mode sound is generated by the sound generating unit based upon the other recognized motion pattern and the set sound signal defined by the sound signal setting controlling unit.

7. The motion-based sound generating apparatus of claim 6, wherein the motion sensing unit includes at least one of an acceleration sensor, an angular velocity sensor, a geomagnetic sensor, and a tilt sensor.

8. The motion-based sound generating apparatus of claim 6, wherein the sound signal setting controlling unit comprises:
- a sound signal identification unit identifying the sound signal that corresponds to the recognized motion pattern; and
- a sound signal setting unit setting the identified sound signal as a set sound signal to be used for the generating of the sound.

9. The motion-based sound generating apparatus of claim 6, wherein the sound generating unit includes a storage section that stores various sound information about sound signals corresponding to motion patterns identifiable by the sound signal setting controlling unit for the set sound signal.

10. The motion-based sound generating apparatus of claim 6, wherein the sound generating unit includes at least one speaker or sound output terminal.

11. The motion-based sound generating apparatus of claim 6, wherein the predetermined device is a cellular phone or a personal digital assistant (PDA).

12. The motion-based sound generating apparatus of claim 6, wherein the mode selection recognizing unit recognizes the user's action based on one of a button manipulation, a voice input, a video input using a camera, and an input of a bio-signal including the user's pupils or finger prints.

13. A motion-based sound setting method comprising:
- recognizing whether a user's action is a sound setting mode or a sound generating mode;
- sensing a motion of a predetermined device when the user's action corresponds the sound setting mode;
- recognizing a motion pattern of the predetermined device; and
- setting a sound signal to be used in generating a sound corresponding to another subsequent recognized motion pattern,
- wherein, in the recognition of the user's action, the user's action is recognized based on one of a button manipulation, a voice input, a video input using a camera, and an input of a bio-signal including the user's pupils or finger prints, and
- wherein during the recognized sound setting mode the setting of the sound signal is set based upon the recognized motion pattern and during the recognized sound generating mode sound is generated based upon another recognized motion pattern of the predetermined device and the set sound signal.

14. The motion-based sound setting method of claim 13, wherein the setting of the sound signal comprises;
- identifying the sound signal that corresponds to the recognized motion pattern; and
- setting the identified sound signal as the set sound signal to be used for the generating of the sound.

15. The motion-based sound setting method of claim 13, wherein, in the recognition of the user's action, the user's action is recognized based on one of a button manipulation, a voice input, a video input using a camera, and an input of a bio-signal including the user's pupils or finger prints.

16. A motion-based sound generating method comprising:
- recognizing whether a user's action is a sound setting mode or a sound generating mode;
- sensing a motion of a predetermined device when the user's action represents a selection of the sound setting mode;
- recognizing a motion pattern of the predetermined device from the sensed motion;
- setting a sound signal to be used in generating a sound corresponding to the recognized motion pattern and recognizing a user's action again; and
- recognizing another users action, another sensing of a motion of the predetermined device, and another motion pattern of the predetermined device, and generating a sound corresponding to the set sound signal and the other recognized motion pattern when the other user's action represents a selection of the sound generating mode,
- wherein recognition of motion patterns includes recognizing the user's action based on one of a button manipulation, a voice input, a video input using a camera, and an input of a bio-signal including user's pupils or finger prints.

17. The motion-based sound generating method of claim 16, wherein the setting of the sound signal comprises:
- identifying the sound signal that corresponds to the recognized motion pattern; and
- setting the identified sound signal as the set sound signal to be used for the generating of the sound.

18. The motion-based sound generating method of claim 16, wherein recognition of motion patterns includes recognizing the user's action based on one of a button manipulation, a voice input, a video input using a camera, and an input of a bio-signal including user's pupils or finger prints.

19. A motion-based sound setting apparatus comprising:
- a mode selection recognizing unit recognizing a users selection of one of a sound setting mode and a sound generating mode based on a user action;
- a motion sensing unit sensing a motion of a predetermined device and outputting a result of the sensing as a sensing signal;
- a motion pattern recognizing unit recognizing a motion pattern of the predetermined device that corresponds to the sensing signal based on a recognition result of the recognition; and
- a sound signal setting controlling unit setting a sound signal to be used for generating a sound corresponding to another subsequent recognized motion pattern,
- wherein the mode selection recognizing unit recognizes the user's action based on one of a button manipulation, a voice input, a video input using a camera, and an input of a bio-signal including the user's pupils or finger prints, and
- wherein during the recognized sound setting mode the setting of the sound signal is set based upon the recognized motion pattern and during the recognized sound generation mode sound is generated based upon another recognized motion pattern of the predetermined device and the set sound signal defined by the sound signal setting controlling unit.

20. A motion-based sound setting apparatus comprising:
- a mode selection recognizing unit recognizing a user's action based on a video input using a camera whether the user's action is a sound setting mode or a sound generating mode;
- a motion sensing unit sensing a motion of a predetermined device and outputting a result of the sensing as a sensing signal;
- a motion pattern recognizing unit recognizing a motion pattern of the predetermined device that corresponds to the sensing signal based on a result of the recognition made by the mode selection recognizing unit; and
- a sound signal setting controlling unit setting a sound signal to be used for generating a sound corresponding to another subsequent motion pattern recognized by the motion pattern recognizing unit, wherein during the recognized sound setting mode the setting of the sound signal is set based upon the recognized motion pattern and during the recognized sound generating mode sound is generated based upon another recognized motion pattern of the predetermined device and the set sound signal defined by the sound signal setting controlling unit.

21. A motion-based sound generating apparatus comprising:

a mode selection recognizing unit recognizing a user's action based on a video input using a camera whether the user's action is a sound setting mode or a sound generating mode;

a motion sensing unit sensing a motion of a predetermined device and outputting a result of the sensing as a sensing signal;

a motion pattern recognizing unit recognizing a motion pattern of the predetermined device that corresponds to the sensing signal based on a result of the recognition made by the mode selection recognizing unit;

a sound signal setting controlling unit setting a sound signal to be used for generating a sound corresponding to another subsequent motion pattern recognized by the motion pattern recognizing unit; and a sound generating unit generating a sound according to the set sound signal, wherein during the recognized sound setting mode the setting of the sound signal is set based upon the recognized motion pattern and during the recognized sound generating mode sound is generated by the sound generating unit based upon the other recognized motion pattern and the set sound signal defined by the sound signal setting controlling unit.

\* \* \* \* \*

UNITED STATES PATENT AND TRADEMARK OFFICE
CERTIFICATE OF CORRECTION

PATENT NO.        : 7,807,913 B2
APPLICATION NO.   : 11/329047
DATED             : October 5, 2010
INVENTOR(S)       : Eunseok Choi et al.

It is certified that error appears in the above-identified patent and that said Letters Patent is hereby corrected as shown below:

Column 7, Line 57 delete "users" and insert -- user's --, therefor.

Column 8, Line 45 after "unit" insert -- ; --.

Column 9, Line 49 (Approx.) delete "comprises;" and insert -- comprises: --, therefor.

Column 10, Line 4 delete "users" and insert -- user's --, therefor.

Column 10, Line 28 (Approx.) delete "users" and insert -- user's --, therefor.

Column 10, Line 50 (Approx.) delete "generation" and insert -- generating --, therefor.

Signed and Sealed this
Eleventh Day of January, 2011

David J. Kappos
*Director of the United States Patent and Trademark Office*